F. DEROSIER.
GATE.
APPLICATION FILED DEC. 4, 1911.
1,035,951.
Patented Aug. 20, 1912.
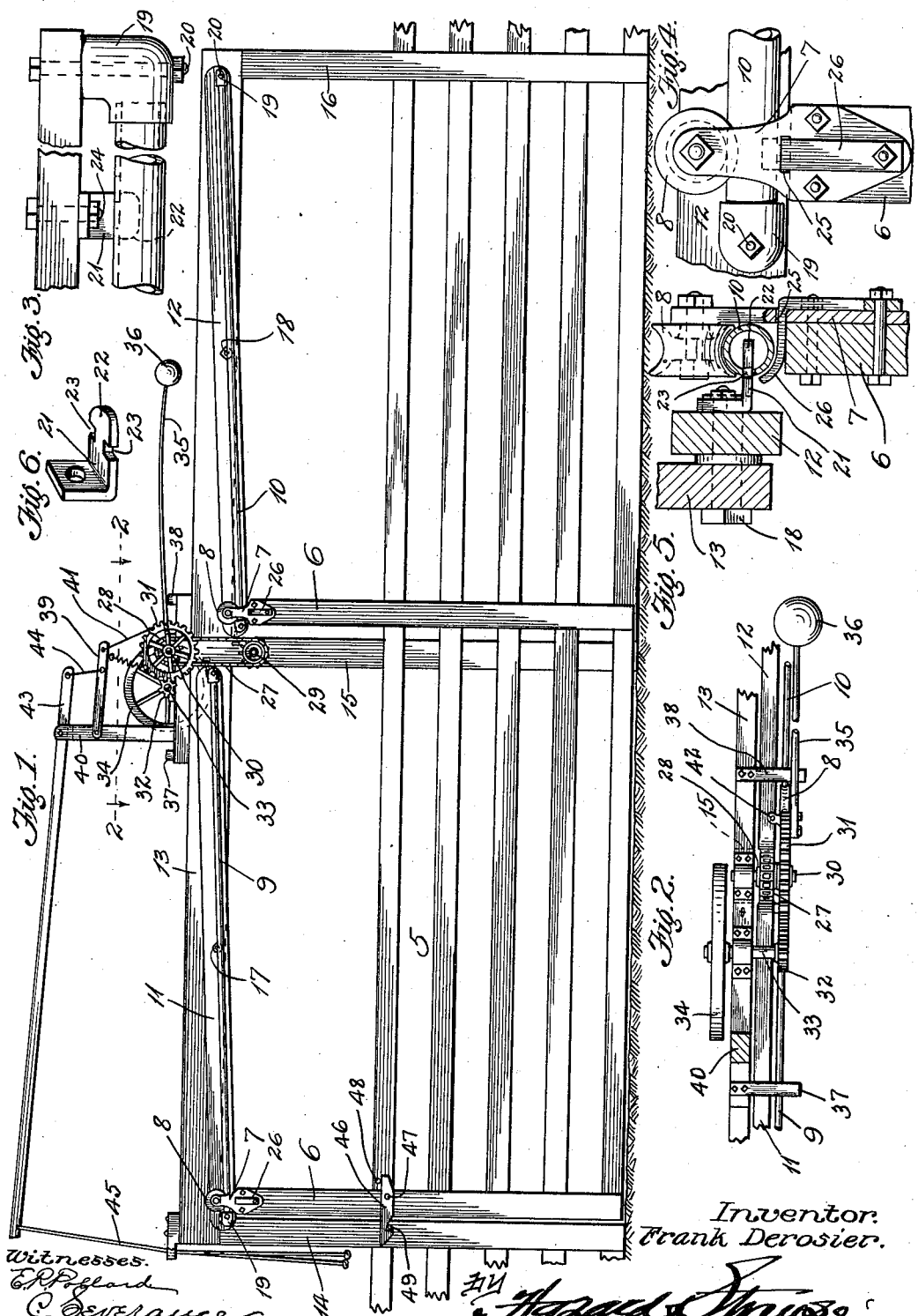
Inventor:
Frank Derosier.

UNITED STATES PATENT OFFICE.

FRANK DEROSIER, OF LONGBEACH, CALIFORNIA.

GATE.

1,035,951.

Specification of Letters Patent. Patented Aug. 20, 1912.

Application filed December 4, 1911. Serial No. 663,833.

*To all whom it may concern:*

Be it known that I, FRANK DEROSIER, a citizen of the United States, residing at Longbeach, in the county of Los Angeles and State of California, have invented new and useful Improvements in Gates, of which the following is a specification.

This invention relates to improvements in gates and has particular relation to gates adapted for farm use or for use in any place where it is desired to pass vehicles without the driver or operator having to leave the vehicle in order to operate said gate.

It is an object of the invention to provide a gate with movable supporting tracks or guides which may be adjusted to cause the gate to roll back and forth.

It is a further object of the invention to provide a gate with guiding supports, and gearing capable of varying the angle of said guiding supports for causing the gate to roll in one direction or the other.

In the accompanying drawing forming a part of this specification, Figure 1 is a side elevation of a gate mechanism constructed in accordance with the present invention. Fig. 2 is a fragmentary sectional view taken upon the line 2—2 of Fig. 1. Fig. 3 is a fragmentary view in top plan of a portion of the track or guiding means for directing the movement of the gate, the mounting of the end and intermediate portions of the track being disclosed. Fig. 4 is a detail view upon an enlarged scale of one of the wheels for supporting the gate with the bracket carrying the same and showing also the adjacent part of the guide rail. Fig. 5 is a detail transverse sectional view through the same. Fig. 6 is a perspective view of a bracket employed at intermediate points for supporting the guide rails or tracks for the gate.

The details and features of the invention will now be more particularly described, reference being had to the said drawing in which 5 indicates a gate which is preferably of the ordinary farm gate type and is formed with end posts 6 which carry the longitudinal bars or slats of the gate.

While the invention is readily adapted for use in opening gates of any type or sliding doors, as for instance the doors of barns and garages, yet the principle is the same as when adapted to use upon a farm gate and for the purpose of illustrating the present invention, a farm gate has been shown in the drawing.

The upper ends of the posts 6 are provided with hangers 7 and supporting rollers 8, the said rollers 8 being adapted to run upon tracks 9 and 10 which are carried by pivoted bars 11 and 12. The pivoted bars are mounted upon framing which is carried well above the gate 5 so as to insure ample head room or space for the occupants of a vehicle or for the covers of vehicles as well. The said framing has a beam 13 extending parallel with the gate and supported on the upper ends of posts 14, 15 and 16. The bars 11 and 12 are preferably pivoted at their central points to the beam 13 as indicated at 17 and 18. The tracks 9 and 10 project laterally from the faces of the bars 11 and 12 a sufficient distance to accommodate the moving rollers 8 of the gate. While the said track may be of any desired material or of any preferred type, I generally form the same of ordinary tubing which is screwed into elbows 19, one elbow being provided at each end of each track and secured to the adjacent end of its supporting bar by means of a bolt 20 passed through the same, and through the said bar. The said tubing may also be supported at intermediate points by brackets 21 having slot engaging heads 22 formed thereon. The tubes are formed with elongated slots opposite the said tracks and the heads 22 of the brackets are inserted in the slots and moved to one end or the other thereof so that the notches 23 behind the heads 22 may be caused to engage the walls of the said tubing at one or the other end of the said slot. After the bracket 21 has been inserted in the slot of the tube it is bolted to the supporting bar by any suitable or ordinary bolt as 24, locking the same in place and insuring the support of the tube. The wheels 8 are preferably formed with grooved peripheries adapted to fit upon the said tubes, as clearly shown in Fig. 5.

The hangers 7 project upwardly upon one side of the wheels 8 only and are generally formed with recesses 25 through which guard pieces 26 may have their curved ends inserted, after which they are secured by bolting or otherwise to the said hangers 7, as will be clearly understood by reference to Figs. 4 and 5 of the drawing. It will be noted that the inner curved ends of the said guard pieces extend behind the tubular brackets a sufficient distance to prevent the wheels 8 from becoming disengaged therefrom.

In order to tip the tracks into inclined positions with respect to each other and with respect to the gate, the adjacent ends of the bars 11 and 12 are secured to the links of a sprocket chain 27, which chain passes about sprocket wheels 28 and 29. The said sprocket wheels are mounted upon the framing above the gate and the sprocket wheel 28 is carried by a shaft 30 which is journaled upon the said framing and which is also provided with a gear wheel 31.

The gear wheel 31 meshes with a pinion 32 secured to a shaft 33 and a fly wheel 34 is also secured to the said shaft 33. The gear wheel 31 has connected with it an elongated spring arm 35 which carries a weight 36 at its outer end. The weight 36 will thus tend to carry the arm 35 to one side or the other of a vertical position and to the limit of its movement, the said arm 35 being limited in motion by projection arms 37 and 38 which project laterally from the supporting framing. The arrangement of the parts is such that when the arm 35 is moved to the position shown in Fig. 1, the sprocket chain 27 will hold the adjacent end of the bar 11 in elevated position and the adjacent end of the bar 12 in depressed position as indicated in said Fig. 1. The tracks 9 and 10 will thus be so inclined that the gate will roll, by the action of gravity, to its closed position. By turning the gear wheel 31 and throwing the arm 35 with the weight 36 to the other extreme of its movement, the position of the tracks will be reversed and the end of the bar 11 connected with the sprocket chain 27 will be depressed whereas the adjacent end of the bar 12 will be elevated. Both tracks will thus be inclined in the opposite direction and cause the gate to roll to its open position. The central pivoting of the bars 11 and 12 permit of their being thus moved into parallel positions with respect to each other. In order to operate the said gear wheel 31 so as to throw the weight from one side to the other, a lever 39 is pivoted to a standard 40 which projects upwardly from the framing of the gate, the outer end of said lever 39 being connected by a cord or cable 41 with a lug or projection 42 which projects from one surface of the said gear wheel 31. The lever 39 is in turn operated by a lever 43 which is fulcrumed upon the said standard 40 and connected by a link or cable 44 with an intermediate portion of said lever 39.

The manually operated free end of the lever 43 is made of considerable length so as to afford ample leverage in operating the gate mechanism. One or more cords 45 may be connected with the said lever 43 and led to any desired point upon either side of the gate for operating the said lever. It is generally preferable to provide the said cord 45 with end portions extending upon opposite sides of the gate structure so that one may be used in opening the gate and the other in closing it, all within the spirit of the invention. It will be understood also that the said cord 45 or its ends may be carried to any desired distance from the gate.

The gate 5 is preferably provided with a latch 46 which is pivoted to the gate at 47 and is prevented from dropping too low by a stop pin 48 engaging the inner end thereof. The outer end of the said latch is formed with a hook portion adapted to engage a pin or projection 49 upon the post 14. It will be observed that because of the pivotal mounting of said latch that when the gate slides to its closed position, the beveled end of the latch will ride upwardly over the pin 49 and the hook portion thereof will drop over said pin. When the gate is to be opened, the elevating thereof by the tipping of the bars 11 and 12 will lift the latch 46 out of engagement with the said pin 49 and the gate will be free to roll to its open position.

The operation of the gate will be readily understood from the above description. In approaching the gate it is only necessary to grasp one end of the rope 45 and pull upon the same in order to turn the gear 31 and throw the arm 35 toward the opposite end of its movement. The arm 35 being preferably of light enough material to give it a spring action will always vibrate so that the weight 36 will be thrown to one side or the other of a vertical position, and will carry the bars 11 and 12 to either of their extreme positions. The tipping of the bars 11 and 12 in the opposite direction to that shown in Fig. 1 will lift the gate, freeing the latch 46 and present downwardly inclined tracks 9 and 10 before the rollers 8. Gravity will thus operate to roll the gate into opened position. After passing through the gate the rope 45 is again pulled, reversing the action of the parts and causing the closing of the gate.

What I claim is:

1. A gate structure comprising a supporting frame, pivoted track members mounted thereon, a gate movable on said track members, a sprocket chain for moving the track members with respect to each other, sprocket wheels supporting the same, a gear connected with one of said sprocket wheels, a fly wheel operable in connection with said gear, a spring lever carried by the said gear having a weight upon its end, and a manually operated lever mechanism for actuating the said gear to throw the weighted lever from one side to the other in operating the gate.

2. A gate mechanism comprising a supporting frame, pivoted track members mounted thereon, an endless chain connecting the track members for altering their inclinations, a gear wheel supporting and actuating said chain, gearing for operating said gear wheel, and levers adapted to actuate said gearing.

3. A gate mechanism comprising a supporting frame, track members pivoted thereon, a sprocket chain connecting the adjacent ends of said track members and capable of altering their inclination, a gear engaging said sprocket chain and capable of moving it, a gear wheel for turning said gear, a lever connected with said gear for moving it, and a power lever for operating the said first mentioned lever in shifting the mechanism so as to reciprocate the gate.

4. A gate structure, comprising a supporting frame, track members pivoted thereon and adapted to be inclined in opposite directions for reciprocating the gate, a sprocket chain connected with the track members, a gear for actuating and supporting said sprocket chain, a wheel for turning said sprocket wheel, said wheel having an arm projecting therefrom, a weight carried upon the outer end of said arm, and levers adapted to move said wheel to throw the weight from one side to the other and to actuate the sprocket wheel for changing the position of the track members.

In witness that I claim the foregoing I have hereunto subscribed my name this 27th day of November, 1911.

FRANK DEROSIER.

Witnesses:
　E. STADTMAN,
　EARLE R. POLLARD.

Copies of this patent may be obtained for five cents each, by addressing the "Commissioner of Patents, Washington, D. C."